(12) United States Patent
Wang et al.

(10) Patent No.: US 10,845,097 B2
(45) Date of Patent: *Nov. 24, 2020

(54) REFRIGERATION SYSTEM HAVING A VARIABLE SPEED COMPRESSOR

(71) Applicant: Thermo Fisher Scientific (Asheville) LLC, Asheville, NC (US)

(72) Inventors: Qi Wang, Arden, NC (US); Todd Swift, Weaverville, NC (US); Richard H. Bair, III, Weaverville, NC (US)

(73) Assignee: Thermo Fisher Scientific (Asheville) LLC, Asheville, NC (US)

( * ) Notice: Subject to any disclaimer, the term of this patent is extended or adjusted under 35 U.S.C. 154(b) by 217 days.

This patent is subject to a terminal disclaimer.

(21) Appl. No.: 16/058,002

(22) Filed: Aug. 8, 2018

(65) Prior Publication Data

US 2018/0347861 A1    Dec. 6, 2018

Related U.S. Application Data

(63) Continuation of application No. 15/649,859, filed on Jul. 14, 2017, now Pat. No. 10,072,876, which is a (Continued)

(51) Int. Cl.
| | |
|---|---|
| *F25B 7/00* | (2006.01) |
| *F25B 49/02* | (2006.01) |
| *F25D 11/04* | (2006.01) |

(52) U.S. Cl.
CPC .............. *F25B 7/00* (2013.01); *F25B 49/022* (2013.01); *F25D 11/04* (2013.01);
(Continued)

(58) Field of Classification Search
CPC ...... F25B 7/00; F25B 49/022; F25B 2500/26; F25B 2600/0253; F25B 2700/1931;
(Continued)

(56) References Cited

U.S. PATENT DOCUMENTS

| | | | |
|---|---|---|---|
| 3,733,845 | A | 5/1973 | Lieberman |
| 4,028,079 | A | 6/1977 | Scheibel |

(Continued)

FOREIGN PATENT DOCUMENTS

| | | |
|---|---|---|
| EP | 0227504 A1 | 7/1987 |
| EP | 1674806 A1 | 6/2006 |

(Continued)

OTHER PUBLICATIONS

European Patent Office, International Search Report and Written Opinion of the International Searching Authority, International Application No. PCT/US2010/050667, dated May 19, 2011 (12 pages).

(Continued)

*Primary Examiner* — Ana M Vazquez
(74) *Attorney, Agent, or Firm* — Wood Herron & Evans LLP

(57) ABSTRACT

A two-stage cascade refrigeration system is provided having a first refrigeration stage and a second refrigeration stage. The first refrigeration stage defines a first fluid circuit for circulating a first refrigerant, and has a first compressor, a condenser, and a first expansion device. The second refrigeration stage defines a second fluid circuit for circulating a second refrigerant, with the second refrigeration stage having a second compressor that is a variable speed compressor, a second expansion device, and an evaporator. A heat exchanger is in fluid communication with the first and second fluid circuits to exchange heat between the first and second refrigerants. A controller stages operation of the first and second compressors and runs the second compressor at an initial speed less than a maximum speed initially when a staging protocol is performed during start up or re-starting of the refrigeration system.

31 Claims, 4 Drawing Sheets

Related U.S. Application Data continuation of application No. 13/196,149, filed on Aug. 2, 2011, now Pat. No. 9,835,360, which is a continuation of application No. 12/570,348, filed on Sep. 30, 2009, now Pat. No. 8,011,191.

(52) U.S. Cl.
CPC ....... *F25B 2500/12* (2013.01); *F25B 2500/26* (2013.01); *F25B 2600/0253* (2013.01); *F25B 2600/111* (2013.01); *F25B 2700/1931* (2013.01); *F25B 2700/1933* (2013.01); *F25B 2700/21151* (2013.01); *F25B 2700/21152* (2013.01); *F25B 2700/21161* (2013.01); *F25B 2700/21174* (2013.01); *F25B 2700/21175* (2013.01); *F25D 2700/02* (2013.01); *F25D 2700/12* (2013.01); *F25D 2700/14* (2013.01); *Y02B 30/70* (2013.01); *Y02B 40/00* (2013.01)

(58) Field of Classification Search
CPC .... F25B 2700/1933; F25B 2700/21151; F25B 2700/21152; F25B 2700/21161; F25B 2700/21174; F25D 11/04; F25D 2700/02; F25D 2700/12
See application file for complete search history.

(56) References Cited

U.S. PATENT DOCUMENTS

| | | |
|---|---|---|
| RE29,621 E | 5/1978 | Conley et al. |
| 4,102,149 A | 7/1978 | Conley et al. |
| 4,120,173 A | 10/1978 | Kimpel |
| 4,222,641 A | 9/1980 | Stolov |
| 4,313,309 A | 2/1982 | Lehman, Jr. |
| 4,455,837 A | 6/1984 | Firey |
| 4,484,531 A | 11/1984 | Firey |
| 4,509,957 A | 4/1985 | Firey |
| 4,523,436 A | 6/1985 | Schedel et al. |
| 4,537,603 A | 8/1985 | Firey |
| 4,568,361 A | 2/1986 | Firey |
| 4,594,858 A | 6/1986 | Shaw |
| 4,606,198 A | 8/1986 | Latshaw et al. |
| 4,679,411 A | 7/1987 | Pearse, Jr. |
| 4,698,080 A | 10/1987 | Gray et al. |
| 4,787,211 A | 11/1988 | Shaw |
| 4,788,829 A | 12/1988 | Takemasa et al. |
| 4,951,475 A | 8/1990 | Alsenz |
| 5,000,009 A | 3/1991 | Clanin |
| 5,079,929 A | 1/1992 | Alsenz |
| 5,095,712 A | 3/1992 | Narreau |
| 5,177,972 A | 1/1993 | Sillato et al. |
| 5,182,920 A | 2/1993 | Matsuoka et al. |
| 5,203,179 A | 4/1993 | Powell |
| 5,203,400 A | 4/1993 | Tsunekawa et al. |
| 5,205,130 A | 4/1993 | Pannell |
| 5,241,829 A | 9/1993 | Irie et al. |
| 5,253,483 A | 10/1993 | Powell et al. |
| 5,255,529 A | 10/1993 | Powell et al. |
| 5,265,434 A | 11/1993 | Alsenz |
| 5,323,618 A | 6/1994 | Yoshida et al. |
| 5,329,781 A | 7/1994 | Farrey et al. |
| 5,335,507 A | 8/1994 | Powell |
| 5,438,844 A | 8/1995 | Hoglund et al. |
| 5,548,969 A | 8/1996 | Lee |
| 5,555,736 A | 9/1996 | Wills et al. |
| 5,570,585 A | 11/1996 | Vaynberg |
| 5,575,329 A | 11/1996 | So et al. |
| 5,586,444 A | 12/1996 | Fung |
| 5,611,214 A | 3/1997 | Wegeng et al. |
| 5,611,216 A | 3/1997 | Low et al. |
| 5,669,234 A | 9/1997 | Houser et al. |
| 5,687,583 A | 11/1997 | Tunekawa et al. |
| 5,694,779 A | 12/1997 | Matsushima et al. |
| 5,694,780 A | 12/1997 | Alsenz |
| 5,711,159 A | 1/1998 | Whipple, III |
| 5,737,940 A | 4/1998 | Yao et al. |
| 5,743,102 A | 4/1998 | Thomas et al. |
| 5,791,160 A | 8/1998 | Mandler et al. |
| 5,797,729 A | 8/1998 | Rafuse, Jr. et al. |
| 5,873,257 A | 2/1999 | Peterson |
| 5,906,107 A | 5/1999 | Takahashi et al. |
| 5,910,161 A | 6/1999 | Fujita et al. |
| 5,927,088 A | 7/1999 | Shaw |
| 5,931,000 A | 8/1999 | Turner et al. |
| 5,946,939 A | 9/1999 | Matsushima et al. |
| 6,016,665 A | 1/2000 | Cole et al. |
| 6,018,958 A | 2/2000 | Lingelbach et al. |
| 6,119,472 A | 9/2000 | Ross |
| 6,128,914 A | 10/2000 | Tamaoki et al. |
| 6,131,401 A | 10/2000 | Ueno et al. |
| 6,134,892 A | 10/2000 | Turner et al. |
| 6,148,628 A | 11/2000 | Reason et al. |
| 6,167,621 B1 | 1/2001 | Goth et al. |
| 6,172,476 B1 | 1/2001 | Tolbert, Jr. et al. |
| 6,189,329 B1 | 2/2001 | Peterson |
| 6,213,194 B1 | 4/2001 | Chrysler et al. |
| 6,216,478 B1 | 4/2001 | Kang |
| 6,237,356 B1 | 5/2001 | Hori et al. |
| 6,257,007 B1 | 7/2001 | Hartman |
| 6,260,377 B1 | 7/2001 | Tamaoki et al. |
| 6,289,692 B1 | 9/2001 | Houser et al. |
| 6,305,187 B1 | 10/2001 | Tsuboe et al. |
| 6,318,101 B1 | 11/2001 | Pham et al. |
| 6,324,856 B1 | 12/2001 | Weng |
| 6,327,867 B1 | 12/2001 | Hyodo et al. |
| 6,330,804 B1 | 12/2001 | Uno et al. |
| 6,349,564 B1 | 2/2002 | Lingelbach et al. |
| 6,370,888 B1 | 4/2002 | Grabon |
| 6,393,858 B1 | 5/2002 | Mezaki et al. |
| 6,401,486 B1 | 6/2002 | Lee et al. |
| 6,405,554 B1 | 6/2002 | Kawakatu et al. |
| 6,408,645 B1 | 6/2002 | Tsuboe et al. |
| 6,430,937 B2 | 8/2002 | Cho et al. |
| 6,438,979 B2 | 8/2002 | Fujita et al. |
| 6,453,691 B1 | 9/2002 | Seo et al. |
| 6,460,355 B1 | 10/2002 | Trieskey |
| 6,467,301 B1 | 10/2002 | Lingelbach et al. |
| 6,467,302 B1 | 10/2002 | Lingelbach et al. |
| 6,487,869 B1 | 12/2002 | Sulc et al. |
| 6,494,054 B1 | 12/2002 | Wong et al. |
| 6,516,622 B1 | 2/2003 | Wilson et al. |
| 6,519,958 B1 | 2/2003 | Moon et al. |
| 6,536,225 B1 | 3/2003 | Yajima |
| 6,543,242 B2 | 4/2003 | Reason et al. |
| 6,550,255 B2 | 4/2003 | Rudick et al. |
| 6,557,358 B2 | 5/2003 | Weng et al. |
| 6,557,361 B1 | 5/2003 | Howard |
| 6,560,980 B2 | 5/2003 | Gustafson et al. |
| 6,564,565 B2 | 5/2003 | Hwang |
| 6,564,578 B1 | 5/2003 | Fischer-Calderon |
| 6,568,197 B2 | 5/2003 | Uno et al. |
| 6,595,009 B1 | 7/2003 | Howard et al. |
| 6,637,222 B2 | 10/2003 | Moon et al. |
| 6,637,226 B2 | 10/2003 | Watanabe et al. |
| 6,640,586 B1 | 11/2003 | Baudat et al. |
| 6,675,590 B2 | 1/2004 | Aarestrup |
| 6,691,524 B2 | 2/2004 | Brooke |
| 6,718,781 B2 | 4/2004 | Freund et al. |
| 6,722,156 B2 | 4/2004 | Tanimoto et al. |
| 6,742,357 B1 | 6/2004 | Roberts |
| 6,766,652 B2 | 7/2004 | Kelly et al. |
| 6,769,264 B2 | 8/2004 | Moon et al. |
| 6,769,265 B1 | 8/2004 | Davis et al. |
| 6,772,607 B2 | 8/2004 | Tsuboe et al. |
| 6,779,353 B2 | 8/2004 | Hu et al. |
| 6,779,356 B2 | 8/2004 | Lee et al. |
| 6,807,817 B2 | 10/2004 | Lee et al. |
| 6,817,198 B2 | 11/2004 | Wilson et al. |
| 6,843,067 B2 | 1/2005 | Lee et al. |
| 6,866,092 B1 | 3/2005 | Molivadas |
| 6,925,831 B2 | 8/2005 | Park et al. |
| 6,966,194 B2 | 11/2005 | Yokozeki et al. |
| 6,986,262 B2 | 1/2006 | Takasugi et al. |

(56) References Cited

U.S. PATENT DOCUMENTS

| | | |
|---|---|---|
| 6,993,918 B1 | 2/2006 | Cowans |
| 6,997,002 B2 | 2/2006 | Moon et al. |
| 7,000,415 B2 | 2/2006 | Daddis, Jr. et al. |
| 7,055,588 B2 | 6/2006 | Nickolay et al. |
| 7,075,268 B2 | 7/2006 | Wills et al. |
| 7,082,786 B2 | 8/2006 | Yasunori et al. |
| 7,086,251 B2 | 8/2006 | Roberts |
| 7,096,681 B2 | 8/2006 | Wills et al. |
| 7,111,467 B2 | 9/2006 | Apparao et al. |
| 7,124,602 B2 | 10/2006 | Lee et al. |
| 7,140,191 B2 | 11/2006 | Lee et al. |
| 7,168,262 B2 | 1/2007 | Hirano et al. |
| 7,193,826 B2 | 3/2007 | Crane et al. |
| 7,207,183 B2 | 4/2007 | Crane et al. |
| RE39,597 E | 5/2007 | Rousseau |
| 7,231,773 B2 | 6/2007 | Crane et al. |
| 7,234,322 B2 | 6/2007 | Hahn et al. |
| 7,246,500 B2 | 7/2007 | Singh et al. |
| 7,260,946 B2 | 8/2007 | Ludwig et al. |
| 7,281,387 B2 | 10/2007 | Daddis, Jr. et al. |
| 7,287,395 B2 | 10/2007 | Nash, Jr. |
| 7,310,953 B2 | 12/2007 | Pham et al. |
| 7,320,228 B2 | 1/2008 | Kamimura et al. |
| 7,337,628 B2 | 3/2008 | Okuda et al. |
| 7,490,480 B2 | 2/2009 | Davis et al. |
| 7,587,911 B2 | 9/2009 | Yanik et al. |
| 7,591,149 B2 | 9/2009 | Ransbarger et al. |
| 7,600,395 B2 | 10/2009 | Eaton et al. |
| 7,617,694 B2 | 11/2009 | Hwang et al. |
| 7,621,148 B1 | 11/2009 | Dain et al. |
| 7,628,028 B2 | 12/2009 | Tolbert, Jr. et al. |
| 7,654,107 B2 | 2/2010 | Okuda et al. |
| 7,661,274 B2 | 2/2010 | Crane et al. |
| 7,665,315 B2 | 2/2010 | Singh et al. |
| 7,677,681 B2 | 3/2010 | Cheon |
| 7,698,904 B2 | 4/2010 | Bersch |
| 7,711,451 B2 | 5/2010 | Aue et al. |
| 7,716,937 B2 | 5/2010 | Schenk et al. |
| 7,721,559 B2 | 5/2010 | Choi et al. |
| 7,721,562 B2 | 5/2010 | Lifson et al. |
| 7,743,617 B2 | 6/2010 | Crane et al. |
| 7,752,854 B2 | 7/2010 | Singh et al. |
| 7,765,812 B2 | 8/2010 | Chang et al. |
| 7,775,058 B2 | 8/2010 | Kaga et al. |
| 7,788,937 B2 | 9/2010 | Kawakatsu et al. |
| 7,845,183 B2 | 12/2010 | Singh et al. |
| 7,874,178 B2 | 1/2011 | McConnell et al. |
| 7,886,549 B2 | 2/2011 | Kawakatsu et al. |
| 7,895,854 B2 | 3/2011 | Bash et al. |
| 7,918,106 B2 | 4/2011 | Fujimoto et al. |
| 7,946,123 B2 | 5/2011 | Tolbert, Jr. et al. |
| 7,946,127 B2 | 5/2011 | Fountain |
| 7,963,117 B2 | 6/2011 | Allen et al. |
| 7,975,497 B2 | 7/2011 | Kaga et al. |
| 8,011,191 B2 | 9/2011 | Wang et al. |
| 8,020,389 B2 | 9/2011 | Ascani |
| 8,020,402 B2 | 9/2011 | Pham et al. |
| 8,037,713 B2 | 10/2011 | Haley et al. |
| 8,042,355 B2 | 10/2011 | Cur et al. |
| 8,061,153 B2 | 11/2011 | Cur et al. |
| 8,069,684 B2 | 12/2011 | Heinbokel et al. |
| 8,072,780 B1 | 12/2011 | Roy |
| 8,145,363 B2 | 3/2012 | Bean, Jr. et al. |
| 8,161,760 B2 | 4/2012 | Cur et al. |
| 8,166,776 B2 | 5/2012 | Kopko et al. |
| 8,180,495 B1 | 5/2012 | Roy |
| 8,181,472 B2 | 5/2012 | Schenk et al. |
| 8,191,377 B2 | 6/2012 | Aiyama et al. |
| 8,196,421 B2 | 6/2012 | Bush et al. |
| 8,229,597 B2 | 7/2012 | Burton |
| 8,231,190 B2 | 7/2012 | Ertz et al. |
| 8,245,524 B2 | 8/2012 | Kuehl |
| 8,257,053 B2 | 9/2012 | Hase et al. |
| 8,311,652 B2 | 11/2012 | Taha et al. |
| 8,312,731 B2 | 11/2012 | Tomioka et al. |
| 8,312,734 B2 | 11/2012 | Lewis |
| 8,336,321 B2 | 12/2012 | Cur et al. |
| 8,336,322 B2 | 12/2012 | Cur et al. |
| 8,375,734 B2 | 2/2013 | Hall et al. |
| 8,381,543 B2 | 2/2013 | Ransbarger et al. |
| 8,400,090 B2 | 3/2013 | Marcinkiewicz et al. |
| 8,408,017 B2 | 4/2013 | Leaver et al. |
| 8,469,782 B1 | 6/2013 | Roy |
| 8,490,425 B2 | 7/2013 | Irfan et al. |
| 8,511,981 B2 | 8/2013 | Small et al. |
| 8,523,643 B1 | 9/2013 | Roy |
| 8,525,340 B2 | 9/2013 | Eckhardt et al. |
| 8,527,098 B2 | 9/2013 | Burton |
| 8,539,785 B2 | 9/2013 | Jiang et al. |
| 8,539,789 B2 | 9/2013 | Kopko et al. |
| 8,555,663 B2 | 10/2013 | Shinya et al. |
| 8,561,418 B2 | 10/2013 | Bash et al. |
| 8,578,724 B2 | 11/2013 | Turner et al. |
| 8,590,327 B2 | 11/2013 | Tobe et al. |
| 8,616,836 B2 | 12/2013 | Blair et al. |
| 8,627,676 B2 | 1/2014 | Thiessen et al. |
| 8,650,906 B2 | 2/2014 | Price et al. |
| 8,671,703 B2 | 3/2014 | Mitra et al. |
| 8,677,773 B2 | 3/2014 | Lee et al. |
| 8,695,365 B2 | 4/2014 | Yazaki et al. |
| 8,716,964 B2 | 5/2014 | Tanaka et al. |
| 8,720,221 B2 | 5/2014 | Anselmino et al. |
| 8,726,680 B2 | 5/2014 | Schenk et al. |
| 8,739,563 B2 | 6/2014 | Coussey et al. |
| 8,756,947 B2 | 6/2014 | Chen et al. |
| 8,769,973 B2 | 7/2014 | Leaver et al. |
| 8,769,974 B2 | 7/2014 | Honda |
| 8,806,888 B2 | 8/2014 | Ko et al. |
| 8,813,511 B2 | 8/2014 | Kopko et al. |
| 8,813,512 B2 | 8/2014 | Rajasekaran et al. |
| 8,820,111 B2 | 9/2014 | Adomat |
| 8,826,686 B2 | 9/2014 | Takasugi |
| 8,836,125 B2 | 9/2014 | Eckhardt et al. |
| 8,844,303 B2 | 9/2014 | Heinbokel et al. |
| 8,857,199 B2 | 10/2014 | Shinya et al. |
| 8,857,204 B2 | 10/2014 | Reytblat |
| 8,875,528 B2 | 11/2014 | Immink et al. |
| 8,881,541 B2 | 11/2014 | Noll et al. |
| 8,887,518 B2 | 11/2014 | Mercer et al. |
| 8,925,339 B2 | 1/2015 | Kearney et al. |
| 8,931,288 B2 | 1/2015 | Qu et al. |
| 8,950,206 B2 | 2/2015 | Caillat |
| 2001/0023594 A1 | 9/2001 | Ives |
| 2001/0030043 A1 | 10/2001 | Gleisle et al. |
| 2002/0023447 A1 | 2/2002 | Podtchereniaev et al. |
| 2004/0118139 A1 | 6/2004 | Kelly et al. |
| 2005/0086959 A1 | 4/2005 | Wilson et al. |
| 2005/0144968 A1 | 7/2005 | Shakespeare |
| 2005/0252226 A1 | 11/2005 | Seefeldt |
| 2005/0253107 A1 | 11/2005 | Flynn et al. |
| 2006/0123834 A1 | 6/2006 | Hwang et al. |
| 2006/0225445 A1 | 10/2006 | Lifson et al. |
| 2007/0044493 A1 | 3/2007 | Kearney et al. |
| 2007/0107464 A1 | 5/2007 | Ransbarger |
| 2007/0113568 A1 | 5/2007 | Jang et al. |
| 2007/0125514 A1 | 6/2007 | Horn et al. |
| 2007/0125527 A1 | 6/2007 | Flik et al. |
| 2007/0130976 A1 | 6/2007 | Akehurst et al. |
| 2007/0151268 A1 | 7/2007 | Jang et al. |
| 2007/0156032 A1 | 7/2007 | Gordon et al. |
| 2007/0193303 A1 | 8/2007 | Hawrysz et al. |
| 2007/0208432 A1 | 9/2007 | Hawrysz |
| 2007/0245770 A1 | 10/2007 | Taha et al. |
| 2007/0276637 A1 | 11/2007 | Allen et al. |
| 2007/0283718 A1 | 12/2007 | Hulsey et al. |
| 2008/0014097 A1 | 1/2008 | Hase et al. |
| 2008/0028779 A1 | 2/2008 | Song |
| 2008/0041076 A1 | 2/2008 | Tutunoglu et al. |
| 2008/0047283 A1 | 2/2008 | Pham et al. |
| 2008/0083237 A1 | 4/2008 | Street et al. |
| 2008/0098770 A1 | 5/2008 | Ransbarger |
| 2008/0115530 A1 | 5/2008 | Mock et al. |
| 2008/0134701 A1 | 6/2008 | Christensen et al. |

(56) References Cited

U.S. PATENT DOCUMENTS

| | | |
|---|---|---|
| 2008/0155993 A1* | 7/2008 | Kuehl ............... F25D 11/02 62/3.6 |
| 2008/0156009 A1 | 7/2008 | Cur et al. |
| 2008/0156031 A1 | 7/2008 | Cur et al. |
| 2008/0156034 A1 | 7/2008 | Cur et al. |
| 2008/0175717 A1 | 7/2008 | Schnetzka et al. |
| 2008/0216493 A1 | 9/2008 | Lin et al. |
| 2008/0217080 A1 | 9/2008 | Maier |
| 2008/0223057 A1 | 9/2008 | Lifson et al. |
| 2008/0240953 A1 | 10/2008 | Kimura |
| 2008/0256976 A1 | 10/2008 | Eaton |
| 2008/0264096 A1 | 10/2008 | Jendrusch et al. |
| 2008/0282718 A1 | 11/2008 | Beagle |
| 2008/0289344 A1 | 11/2008 | Bonte et al. |
| 2008/0289350 A1 | 11/2008 | Shapiro |
| 2008/0307813 A1 | 12/2008 | Lifson et al. |
| 2009/0071189 A1 | 3/2009 | Martins et al. |
| 2009/0090113 A1 | 4/2009 | Caillat |
| 2009/0093917 A1 | 4/2009 | Smith |
| 2009/0126901 A1 | 5/2009 | Hegar et al. |
| 2009/0133412 A1 | 5/2009 | Narayanamurthy et al. |
| 2009/0205344 A1 | 8/2009 | Ascani |
| 2009/0235678 A1 | 9/2009 | Taras et al. |
| 2009/0272128 A1 | 11/2009 | Ali |
| 2009/0277196 A1 | 11/2009 | Gambiana et al. |
| 2010/0011806 A1 | 1/2010 | Nam et al. |
| 2010/0043460 A1 | 2/2010 | Van de Vyver |
| 2010/0058801 A1 | 3/2010 | Masani et al. |
| 2010/0175402 A1 | 7/2010 | Schenk et al. |
| 2010/0175423 A1 | 7/2010 | Walther |
| 2010/0175424 A1 | 7/2010 | Walther |
| 2010/0175425 A1 | 7/2010 | Walther |
| 2010/0263393 A1 | 10/2010 | Chen et al. |
| 2010/0281915 A1 | 11/2010 | Roberts et al. |
| 2010/0287964 A1 | 11/2010 | Okamoto |
| 2010/0319375 A1 | 12/2010 | Matsubara et al. |
| 2010/0326133 A1 | 12/2010 | Beeby et al. |
| 2011/0023532 A1 | 2/2011 | Kobayashi et al. |
| 2011/0030402 A1 | 2/2011 | Shinya et al. |
| 2011/0072839 A1 | 3/2011 | Itagaki et al. |
| 2011/0107775 A1 | 5/2011 | Akehurst et al. |
| 2011/0113795 A1 | 5/2011 | Montminy et al. |
| 2011/0120179 A1 | 5/2011 | Chin et al. |
| 2011/0138823 A1 | 6/2011 | Troutman et al. |
| 2011/0192181 A1 | 8/2011 | Yi et al. |
| 2011/0265502 A1 | 11/2011 | Maxwell |
| 2011/0271690 A1 | 11/2011 | Cocchi et al. |
| 2011/0289953 A1 | 12/2011 | Alston |
| 2011/0296860 A1 | 12/2011 | Honda |
| 2011/0296861 A1 | 12/2011 | Honda |
| 2011/0302939 A1 | 12/2011 | Rockenfeller et al. |
| 2011/0302943 A1 | 12/2011 | Honda |
| 2011/0302947 A1 | 12/2011 | Honda |
| 2011/0314855 A1 | 12/2011 | Yu et al. |
| 2012/0036876 A1 | 2/2012 | Honda |
| 2012/0038120 A1 | 2/2012 | Bartlett et al. |
| 2012/0060525 A1 | 3/2012 | Schork et al. |
| 2012/0102991 A1 | 5/2012 | Lee et al. |
| 2012/0111032 A1 | 5/2012 | Woo et al. |
| 2012/0117996 A1 | 5/2012 | Hinde et al. |
| 2012/0123578 A1 | 5/2012 | Ransbarger et al. |
| 2012/0151950 A1 | 6/2012 | Jagusztyn |
| 2012/0174607 A1 | 7/2012 | Cur et al. |
| 2012/0180556 A1 | 7/2012 | Webster et al. |
| 2012/0186279 A1 | 7/2012 | Cur et al. |
| 2012/0210736 A1 | 8/2012 | Rockenfeller et al. |
| 2012/0247127 A1 | 10/2012 | Kuehl |
| 2012/0260685 A1 | 10/2012 | Honda |
| 2012/0266623 A1 | 10/2012 | Patel et al. |
| 2012/0279236 A1 | 11/2012 | Douglas et al. |
| 2012/0285186 A1 | 11/2012 | Honda |
| 2012/0312042 A1 | 12/2012 | Jeong et al. |
| 2013/0008204 A1 | 1/2013 | Kim et al. |
| 2013/0061622 A1 | 3/2013 | Kubota et al. |
| 2013/0082409 A1 | 4/2013 | Guthrie |
| 2013/0091891 A1 | 4/2013 | Hinde et al. |
| 2013/0098071 A1 | 4/2013 | Means |
| 2013/0098085 A1 | 4/2013 | Judge et al. |
| 2013/0098086 A1 | 4/2013 | Sillato et al. |
| 2013/0139529 A1 | 6/2013 | Lu et al. |
| 2013/0149173 A1 | 6/2013 | Kitchener et al. |
| 2013/0160470 A1 | 6/2013 | Schuster et al. |
| 2013/0160474 A1 | 6/2013 | Qu et al. |
| 2013/0167582 A1 | 7/2013 | Jones |
| 2013/0180278 A1 | 7/2013 | Yamashita et al. |
| 2013/0199238 A1 | 8/2013 | Mock et al. |
| 2013/0227984 A1 | 9/2013 | Tsunoda et al. |
| 2013/0261810 A1 | 10/2013 | Burton |
| 2013/0263611 A1 | 10/2013 | Kearney et al. |
| 2013/0305756 A1 | 11/2013 | Gomes et al. |
| 2013/0312439 A1 | 11/2013 | Howell |
| 2013/0327077 A1 | 12/2013 | Motsenbocker |
| 2013/0327085 A1 | 12/2013 | Eaton |
| 2013/0340452 A1 | 12/2013 | Kleman et al. |
| 2013/0340462 A1 | 12/2013 | Bush et al. |
| 2014/0013784 A1 | 1/2014 | Park et al. |
| 2014/0034285 A1 | 2/2014 | Robinson |
| 2014/0047855 A1 | 2/2014 | Kolarich |
| 2014/0069122 A1 | 3/2014 | Lockhart |
| 2014/0075986 A1 | 3/2014 | Hodges |
| 2014/0083124 A1 | 3/2014 | Sugimoto et al. |
| 2014/0096547 A1 | 4/2014 | Boehde |
| 2014/0130527 A1 | 5/2014 | Dumas et al. |
| 2014/0150491 A1 | 6/2014 | Davies et al. |
| 2014/0150492 A1 | 6/2014 | Davies et al. |
| 2014/0165632 A1 | 6/2014 | Abbasi et al. |
| 2014/0182327 A1 | 7/2014 | Kobayashi et al. |
| 2014/0182328 A1 | 7/2014 | Kobayashi et al. |
| 2014/0186173 A1 | 7/2014 | Blair et al. |
| 2014/0190205 A1 | 7/2014 | Bonnissel et al. |
| 2014/0196489 A1 | 7/2014 | Emo et al. |
| 2014/0202190 A1 | 7/2014 | Matsui et al. |
| 2014/0202197 A1 | 7/2014 | Anselmino et al. |
| 2014/0230464 A1 | 8/2014 | Abbasi et al. |
| 2014/0230466 A1 | 8/2014 | Noll et al. |
| 2014/0230467 A1 | 8/2014 | Noll et al. |
| 2014/0250929 A1 | 9/2014 | Takahashi et al. |
| 2014/0260361 A1 | 9/2014 | Rodier |
| 2014/0260366 A1 | 9/2014 | Kuehl |
| 2014/0260415 A1 | 9/2014 | Ducote, Jr. et al. |
| 2014/0311169 A1 | 10/2014 | McDonnell et al. |
| 2014/0318161 A1 | 10/2014 | Furberg et al. |
| 2014/0326018 A1 | 11/2014 | Ignatiev |
| 2014/0345307 A1 | 11/2014 | Bagley et al. |
| 2014/0353542 A1 | 12/2014 | Seshamani |
| 2014/0360211 A1 | 12/2014 | Hovel et al. |
| 2014/0360212 A1 | 12/2014 | Bae et al. |

FOREIGN PATENT DOCUMENTS

| | | | |
|---|---|---|---|
| EP | 1775528 A1 | 4/2007 | |
| JP | 56161259 | 4/1955 | |
| JP | 02192546 A | 7/1990 | |
| JP | 04148160 A | 5/1992 | |
| JP | 5302763 | 11/1993 | |
| JP | H10267441 A | 10/1998 | |
| JP | 2000205672 A | 7/2000 | |
| JP | 2004190917 A | 7/2004 | |
| JP | 2004333043 A | 11/2004 | |
| JP | 2007018137 A | 1/2007 | |
| JP | 2007219904 A | 8/2007 | |
| JP | 2008002759 A | 1/2008 | |
| JP | 2008800593 A * | 1/2008 | ............... F25B 7/00 |
| JP | 2009133503 A | 6/2009 | |
| TW | 200817643 A | 4/2008 | |
| WO | 2008001667 A1 | 1/2008 | |

OTHER PUBLICATIONS

Thermo Fisher Scientific, Jouan Freezer, set of photographs and refrigeration circuit diagram depicting an insulated enclosure supported within the deck of an ultra-low temperature freezer ("ULT") manufactured and sold by Jouan (12 pages).

(56) References Cited

OTHER PUBLICATIONS

Chinese Patent Office, Office Action, Application No. 201080003310.9, dated Feb. 14, 2014 (8 pages).
Chinese Patent Office, English Translation of Office Action, Application No. 201080003310.9, dated Feb. 14, 2014 (5 pages).
Japanese Patent Office, English Translation, Patent Abstracts of Japan, Publication No. 02192546 A, published Jul. 30, 1990 (1 page).
Japanese Patent Office, English Translation, Patent Abstracts of Japan, Publication No. 04148160 A, published May 21, 1992 (1 page).
Japanese Patent Office, English Translation, Patent Abstracts of Japan, Publication No. 2007018137 A, published Jan. 25, 2007 (1 page).
Japanese Patent Office, English Translation, Patent Abstracts of Japan, Publication No. 2009-133503 A, published Jun. 18, 2009 (1 page).
Japanese Patent Office, English Translation, Office Action, Application No. 2012-532261, dated Jul. 28, 2014 (4 pages).
Japanese Patent Office, Office Action, Application No. 2012-532261, dated Jul. 28, 2014 (4 pages).
European Patent Office, First Examination Report, Application No. 10763555.9, dated Sep. 30, 2015 (10 pages).
Japanese Patent Office, First Office Action, Application No. 2015135863 dated May 16, 2016 (7 pages).
Espacenet, English Machine Translation of Abstract, JP2004190917A, published Jul. 8, 2004, retrieved from http://worldwide.espacenet.com on Jun. 13, 2016 (2 pages).
Japanese Patent Office, English Machine Translation of Abstract, JP2004333043A, published Nov. 25, 2004 (1 page).
Espacenet, English Machine Translation of Abstract for TW200817643A, published Apr. 16, 2008, retrieved from https://worldwide.espacenet.com on Aug. 23, 2016 (2 pages).
European Patent Office, Examination Report, Application No. 10763555.9, dated Apr. 21, 2016 (8 pages).
Chinese Patent Office, Office Action, Application No. 201510029458.4, dated Aug. 1, 2016 (14 pages).
Chinese Patent Office, Second Office Action, Application No. 201510029458.4, dated Jun. 2, 2017 (11 pages).
Japanese Patent Office, English Translation, Office Action, Application No. 2017-111456, dated Apr. 23, 2018 (9 pages).
Japanese Patent Office, Espacenet Machine Translation Japanese Publication No. JP2004190917(A) to English (12 pages).
European Patent Office, extended European Search Report issued in EP Application No. 18161237.5-1009, dated Jun. 26, 2018 (13 pages).
Japanese Patent Office, English Translation, Notice of Allowance, Application No. 2017-111456, dated Jun. 25, 2018 (6 pages).
The State Intellectual Property Office of the People's Republic of China, Reexamination Decision, Application No. 201510029458.4, dated May 21, 2019 (26 pages).

* cited by examiner

REFRIGERATION SYSTEM HAVING A VARIABLE SPEED COMPRESSOR

CROSS REFERENCE TO RELATED APPLICATIONS

The present application is a continuation of co-pending U.S. Ser. No. 15/649,859, filed Jul. 14, 2017, which is a continuation of U.S. Ser. No. 13/196,149, filed Aug. 2, 2011, now U.S. Pat. No. 9,835,360, which is a continuation of U.S. Ser. No. 12/570,348, filed Sep. 30, 2009, now U.S. Pat. No. 8,011,191, the disclosures of which are hereby incorporated herein by reference in their entireties.

TECHNICAL FIELD

The present invention relates generally to refrigeration systems and, more particularly, to two-stage cascade refrigeration systems.

BACKGROUND

Two-stage cascade refrigeration systems are known for cooling spaces such as the interior of cabinets, for example, to temperatures well below zero degrees centigrade, such as temperatures below −40° C., for example. For example, freezers of the type known as ultra-low temperature freezers ("ULT's") are known to use this type of refrigeration system and are used to cool cabinet interiors to temperatures as low as about −80° C. or even lower.

Refrigeration systems of this type are known to include two stages circulating respective first and second refrigerants. The first stage transfers energy (i.e., heat) from the first refrigerant to the surrounding environment through a condenser, while the second refrigerant of the second stage receives energy from the cooled space (e.g., a cabinet interior) through an evaporator. Heat is transferred from the second refrigerant to the first refrigerant through a heat exchanger that is in fluid communication with the two stages of the refrigeration system.

Conventional two-cascade refrigeration systems utilize compressors each having a single, fixed speed, and conventionally having the same maximum capacity. In this regard, operation of the system may entail simply activating and deactivating each of the two compressors at various times. The ability of systems of this type to attain a uniform temperature in the cooled space, however, is limited, and the efficiency of operating such systems is also limited, as is the life expectancy of the systems themselves. In addition, operating one or both of the compressors at maximum capacity may be detrimental, while operating one or both of the compressors at a capacity lower than the maximum capacity for that compressor results in operational inefficiencies. Further, conventional two-cascade refrigeration systems are known to operate at a single predetermined level of noise during steady-state operation.

It would be desirable, therefore, to provide a refrigeration system that addresses these and other problems associated with conventional two-stage cascade refrigeration systems.

SUMMARY

In one embodiment, a two-stage cascade refrigeration system is provided having a first refrigeration stage and a second refrigeration stage. The first refrigeration stage defines a first fluid circuit for circulating a first refrigerant, and has a first compressor, a condenser, and a first expansion device that is in fluid communication with the first fluid circuit. The second refrigeration stage defines a second fluid circuit for circulating a second refrigerant, with the second refrigeration stage having a second compressor, a second expansion device, and an evaporator that is in fluid communication with the second fluid circuit. A heat exchanger is in fluid communication with the first and second fluid circuits to exchange heat between the first and second refrigerants. At least one of the first or second compressors is a variable speed compressor.

In specific embodiments, each of the first and second compressors is a variable speed compressor. The first compressor may have a first maximum capacity and the second compressor may have a second maximum capacity, with the second maximum capacity being, in some embodiments, less than the first maximum capacity, and being, in other embodiments, substantially equal to the first maximum capacity.

In embodiments where the second compressor is a variable speed compressor, the system may include at least one controller that is operatively coupled to the first and second compressors for independently controlling operation of the compressors, and a sensor that is operatively coupled to the at least one controller. The sensor may, for example, be configured to sense a temperature of the first refrigerant at an outlet of the heat exchanger, sense a discharge pressure of the first or second refrigerants, or sense a discharge temperature or a suction temperature of the first refrigerant, and to generate a signal that is indicative of the sensed temperature or pressure to the at least one controller, with the at least one controller being operable to vary the speed of the second compressor in response to the signal.

In other specific embodiments, each of the first and second compressors is a variable speed compressor and the system includes a cabinet having an interior and a door that provides access into the interior, and at least one controller that is operatively coupled to the first and second compressors for independently controlling operation thereof. A sensor is operatively coupled to the at least one controller and is configured to sense a condition of the door and to generate a signal that is indicative of the sensed condition to the at least one controller, with the at least one controller being operable to vary the speed of at least one of the first or second compressors in response to the signal. The system may alternatively or additionally include a sensor that is configured to sense the temperature of ambient air proximate the condenser and to generate a signal to the at least one controller that is indicative of the sensed temperature, with the at least one controller being operable, in response to the signal, to vary the speed of the at least one of the first or second compressors.

In specific embodiments, the system includes a sensor that is operatively coupled to the at least one controller and which is configured to sense a temperature of the first refrigerant at an outlet of the heat exchanger and to generate a signal that is indicative of the sensed temperature to the at least one controller. The at least one controller is operable to compare the sensed temperature to a pre-determined threshold temperature above which the second compressor is not activated by the at least one controller. Additionally, the system may include a sensor that is configured to sense the temperature of ambient air proximate the condenser and to generate a second signal indicative of the sensed temperature to the at least one controller. The at least one controller is operable, in response to the second signal, to vary the pre-determined threshold temperature above which the second compressor is not activated by the at least one controller.

The system may include a cabinet having an interior and a sensor operatively coupled to the at least one controller and which is configured to sense the temperature of the interior of the cabinet and to generate a signal indicative of the cabinet interior temperature to the at least one controller, with the at least one controller being operable, in response to this signal, to delay activation of the second compressor. The controller of some embodiments may vary the speed of a variable speed fan directing air across the condenser, for example, in response to a signal received from a sensor configured to sense the temperature of ambient air proximate the condenser.

The system may include a pair of sensors operatively coupled to the at least one controller and which are configured to respectively sense the discharge pressures of the first and second refrigerants and to generate respective signals to the at least one controller indicative of the sensed discharge pressures. The at least one controller is operable, in response to the signals, to vary the speed of at least one of the first or second compressors.

The system may additionally or alternatively include a first plurality of sensors for sensing one or more of the suction temperature, sump temperature, discharge temperature, or discharge pressure of the first refrigerant, and a second plurality of sensors for sensing one or more of the suction temperature, sump temperature, discharge temperature or discharge pressure of the second refrigerant. The first and second pluralities of sensors may be configured to generate respective signals to the at least one controller which are indicative of the sensed temperatures or pressures, with the at least one controller being operable, in response to the signals, to vary the speed of at least one of the first or second compressors.

The system may also include a control interface operatively coupled to the at least one controller for selecting among different pre-determined noise level modes of operation of the refrigeration system. The controller may include a steady-state operation mode that includes simultaneous operation of the first and second compressors.

In yet another embodiment, a method is provided for operating a refrigeration system. The method includes circulating a first refrigerant through a first compressor, a condenser, and a first expansion device of a first stage of the refrigeration system. A second refrigerant is circulated through a second compressor, a second expansion device, and an evaporator of a second stage of the refrigeration system. Heat is exchanged between the first and second refrigerants and the speed of at least one of the first or second compressors is selectively varied to control the flow of at least one of the first or second refrigerants.

The system disclosed herein is, accordingly, capable of attaining a relative long life expectancy, operating in an efficient manner, and attaining a uniform temperature distribution in the cooled space. Further, the system disclosed herein is capable of quickly recovering from unexpected high-load conditions resulting, for example, from the storing of a relatively warm item in the cooled space.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
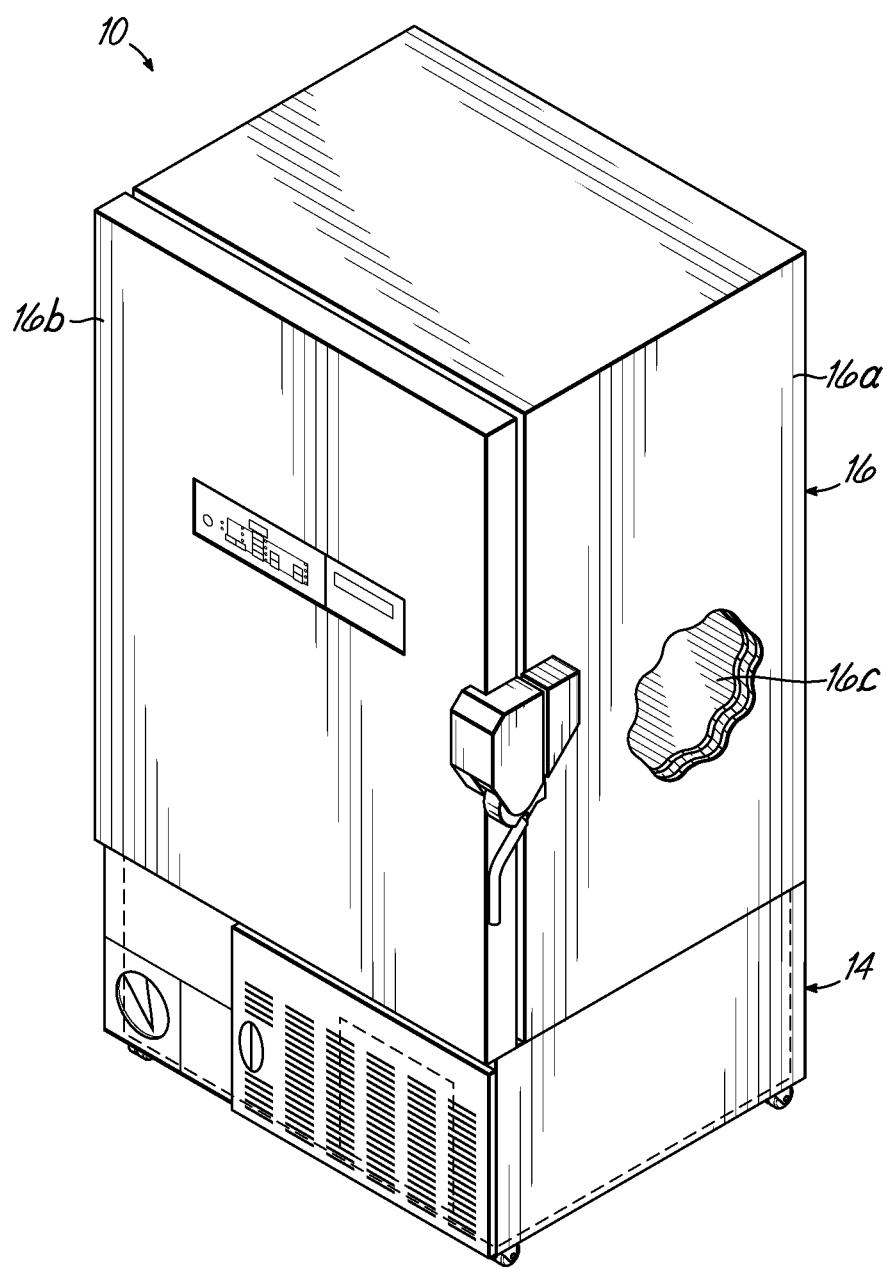
FIG. 1 is a perspective view of an exemplary refrigeration unit.

With reference to the figures, and more specifically to FIG. 1, a refrigeration unit in the form of an ultra-low temperature freezer ("ULT") 10 is illustrated. Various aspects of the exemplary freezer 10 according to one embodiment of the present invention are described and illustrated in commonly assigned U.S. patent application Ser. No. 12/570,480, the disclosure of which is hereby expressly incorporated by reference herein in its entirety.

The freezer 10 of FIG. 1 includes a deck 14 that supports a cabinet 16 thereabove, for storing items that require cooling to temperatures of about −80° C. or lower, for example. The cabinet 16, in turn, includes a cabinet housing 16*a* and a door 16*b* providing access into an interior 16*c* of the cabinet 16. The deck 14 supports one or more components that jointly define a two-stage cascade refrigeration system 20 (FIG. 2) that thermally interacts with cabinet 16 to cool the interior 16*c* thereof.

Figure 2:
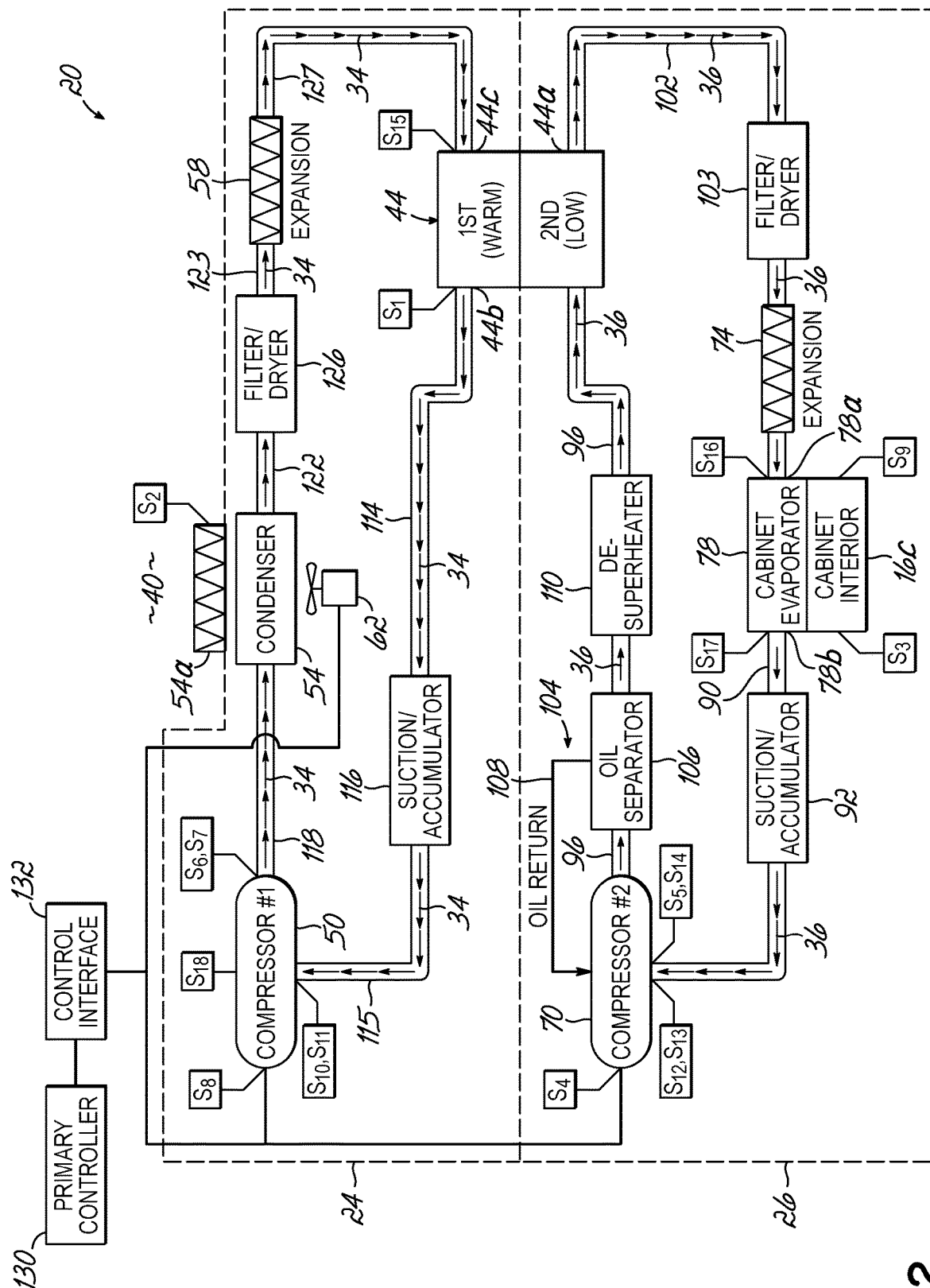
FIG. 2 is a schematic representation of a refrigeration system for cooling a cabinet interior of the unit of FIG. 1.

With reference to FIG. 2, a schematic representation of refrigeration system 20 is illustrated. System 20 is made up of a first stage 24 and a second stage 26 respectively defining first and second circuits for circulating a first refrigerant 34 and a second refrigerant 36. The first stage 24 transfers energy (i.e., heat) from the first refrigerant 34 to the surrounding environment 40, while the second refrigerant 36 of the second stage 26 receives energy from a cabinet interior 16*c*. Heat is transferred from the second refrigerant 36 to the first refrigerant 34 through a heat exchanger 44 that is in fluid communication with the first and second stages 24, 26 of the refrigeration system 20.

The first stage 24 includes, in sequence, a first compressor 50, a condenser 54, and a first expansion device 58. A fan 62 directs ambient air across the condenser 54 through a filter 54*a* and facilitates the transfer of heat from the first refrigerant 34 to the surrounding environment 40. The second stage 26 includes, also in sequence, a second compressor 70, a second expansion device 74, and an evaporator 78. The evaporator 78 is in thermal communication with the interior 16*c* of cabinet 16 (FIG. 1) such that heat is transferred from the interior 16*c* to the evaporator 78, thereby cooling the interior 16*c*. The heat exchanger 44 is in fluid communication with the first stage 24 between the first expansion device 58 and the first compressor 50. Further, the heat exchanger 44 is in fluid communication with the second stage 26 between the second compressor 70 and the second expansion device 74.

In operation, the second refrigerant 36 receives heat from the interior 16*c* through the evaporator 78 and flows from the evaporator 78 to the second compressor 70 through a conduit 90. A suction/accumulator device 92 is in fluid communication with the conduit 90 to pass the second refrigerant 36 in gaseous form to the second compressor 70, while accumulating excessive amounts of the same in liquid form and feeding it to the second compressor 70 at a controlled rate. From the second compressor 70, the compressed second refrigerant 36 flows through a conduit 96 and into the heat exchanger 44 thermally communicating the first and second stages 24, 26 with one another. The second refrigerant 36 enters the heat exchanger 44 in gas form and transfers heat to the first refrigerant 34 as the second refrigerant condenses. In this regard, the flow of the first refrigerant 34 may, for example, be counter-flow relative to the second refrigerant 36, so as to maximize the rate of heat transfer. In one specific, non-limiting example, the heat exchanger 44 is in the form of a brazed plate heat exchanger, vertically oriented within the deck 14 (FIG. 1), and designed to maximize the amount of turbulent flow of the first and second refrigerants 34, 36 within heat exchanger 44, which in turn maximizes the heat transfer from the condensing second refrigerant 36 to the evaporating first refrigerant 34. Other types or configurations of heat exchangers are possible as well.

The second refrigerant 36 exits the heat exchanger 44, in liquid form, through an outlet 44a thereof and flows through a conduit 102, through a filter/dryer unit 103, then through the second expansion device 74, and then back to the evaporator 78 of the second stage 26. The second stage 26 of this exemplary embodiment also includes an oil loop 104 for lubricating the second compressor 70. Specifically, the oil loop 104 includes an oil separator 106 in fluid communication with conduit 96 and an oil return line 108 directing oil back into second compressor 70. Additionally, or alternatively, the second stage 26 may include a de-superheater device 110 to cool down the discharge stream of the second refrigerant 36 and which is in fluid communication with conduit 96 upstream of the heat exchanger 44.

As discussed above, the first refrigerant 34 flows through the first stage 24. Specifically, the first refrigerant 34 receives heat from the second refrigerant 36 flowing through the heat exchanger 44, exits the heat exchanger 44 in gas form through an outlet 44b thereof and flows through a pair of conduits 114, 115 towards the first compressor 50. A suction/accumulator device 116 is positioned between conduits 114 and 115 to pass the first refrigerant 34 in gaseous form to the first compressor 50, while accumulating excessive amounts of the same in liquid form and feeding it to the first compressor 50 at a controlled rate. From the first compressor 50, the compressed first refrigerant 34 flows through a conduit 118 and into the condenser 54. The first refrigerant 34 in condenser 54 transfers heat to the surrounding environment 40 as the first refrigerant condenses before flowing in liquid form through a pair of conduits 122, 123, through a filter/dryer unit 126, and into the first expansion device 58, where the first refrigerant 34 undergoes a pressure drop. From the first expansion device 58, the first refrigerant 34 flows through a conduit 127 back into the heat exchanger 44, entering the same in liquid form.

With continued reference to FIG. 2, at least one of the first or second compressors 50, 70 of this embodiment is a variable speed compressor. In a specific embodiment, the first and second compressors 50, 70 may have different maximum capacities. For example, and without limitation, the second compressor 70 may have a maximum capacity that is less than the maximum capacity of the first compressor 50. Alternatively, the maximum capacities of the first and second compressors 50, 70 may be substantially equal to one another. Moreover, operation of the system 20 may be designed such that, in steady-state mode, one or both of the compressors 50, 70 operates at the maximum capacity or at less than its maximum capacity, which may be desirable, for example, to maximize the life expectancy of the compressors 50, 70.

System 20 includes an exemplary controller 130 that is operatively coupled to each of the first and second compressors 50, 70 for independently controlling each of the compressors 50, 70. While this embodiment illustrates a single controller 130, those of ordinary skill in the art will readily appreciate that system 20 may have any other number of controllers instead. An exemplary interface 132 is operatively coupled to the controller 130 to enable interaction with the controller by a user. Such interaction may include, for example, choosing from among different modes of operation of system 20. For example, and without limitation, different modes of operation may be associated with different maximum normally accepted noise levels of the system 20 during steady-state operation, such as noise standards issued by OSHA, for example, different temperature ranges for each of the stages 24, 26, and/or different temperature settings for the cooled space (e.g., cabinet interior 16c). More specifically, the same freezer designed for operation in an enclosed laboratory may be set by the user not to exceed a particular noise level (which could result in one or both compressors being limited to a particular percentage of maximum speed and, if a variable speed fan is used, its speed as well). The same freezer operated in a large area could be set or reset to allow for a higher percentage of maximum speed if the noise level is of particular concern to the user. Other additional or alternative preferred operating characteristics of the ULT may, however, be used to define operating parameters of the system 20.

As explained in further detail below, a plurality of sensors $S_1$ through $S_{18}$ are each operatively coupled to the controller 130 to sense different properties of the one or both of the refrigerants 34, 36 along the first and/or second stages 24, 26, the temperature of the ambient air surrounding the system 20, or that of the interior 16c of cabinet 16, and/or the condition of the door 16b (i.e., open or closed) (FIG. 1). These sensors are configured to generate respective signals to the controller 130 that are indicative of the sensed property or condition, such that the controller 130 may, in turn, generate respective commands impacting operation of the system 20.

When the system 20 is first started or requires restarting due, for example, to revised cooling requirements, staging of the first and second stages is effected. An exemplary staging procedure or protocol is illustrated with continued reference to FIG. 2 and with further reference to the flow chart of FIG. 3. Block 150 represents the start of the staging procedure, specifically through activation (i.e., turning on) of the first compressor 50 and ends with activation (i.e., turning on) of the second compressor 70 (block 160). At block 152, the controller 130 receives a signal from a sensor $S_1$ that is configured to sense the temperature of the first refrigerant 34 at the outlet 44b of heat exchanger 44. At block 154, the controller 130 compares the sensed temperature of the first refrigerant 34 to a predetermined threshold temperature $T_{th}$. If the sensed temperature is less than or equal to the threshold temperature $T_{th}$, (block 156), the controller 130 activates the second stage 26 by activating the second compressor 70 (block 160). In certain forms of the invention, the controller 130 could cause the second compressor 70 to initially operate at a lower speed and then increase to a higher maximum speed, depending upon operator settings for noise control and the like.

Figure 3:
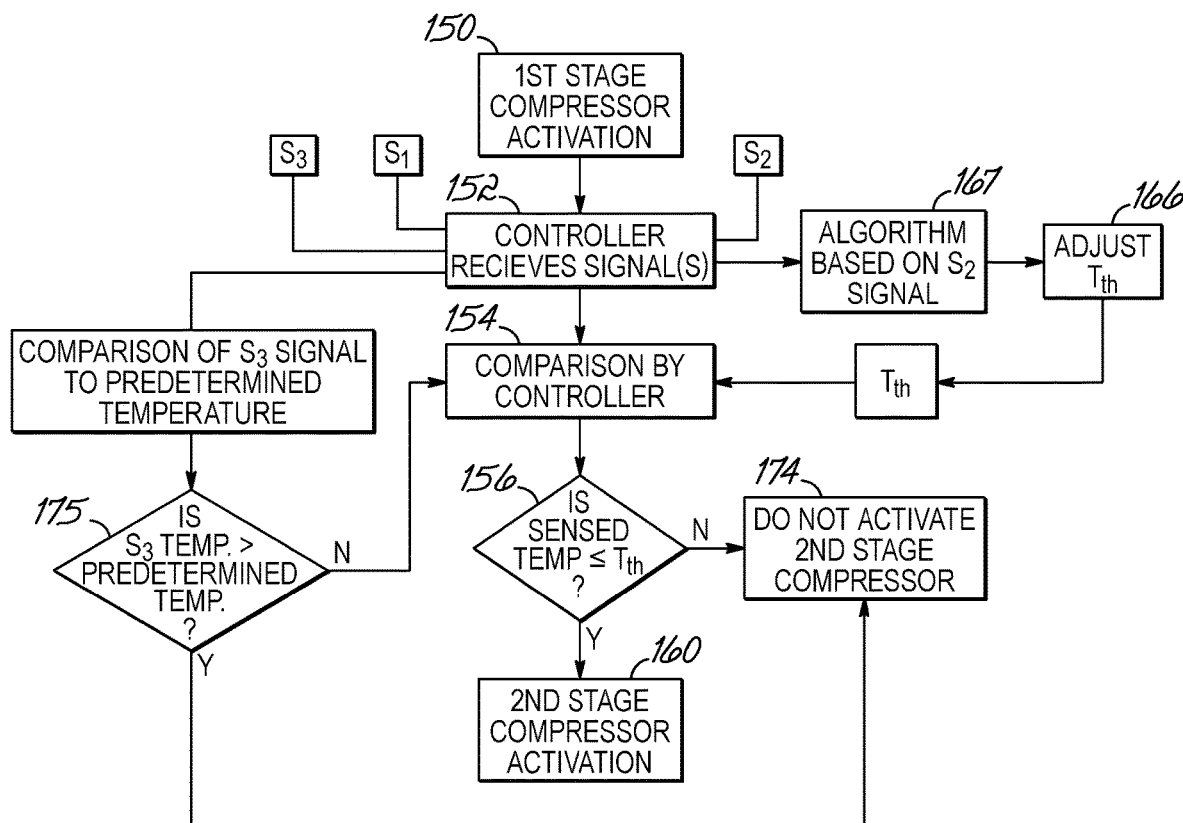
FIG. 3 is a schematic representation of a staging protocol for operation of the system of FIG. 2.

In addition to the staging protocol illustrated in FIG. 3, the staging protocol may additionally include other features. For example, the staging protocol may include, at block 152, the controller 130 receiving a signal from a sensor $S_2$ that is configured to sense the temperature of ambient air proximate the condenser 54 and to send a signal indicative of the sensed temperature to the controller 130. At block 166, the controller 130 adjusts (i.e., increases or decreases) the threshold temperature $T_{th}$ according to a predetermined algorithm (block 167) taking the sensed ambient air temperature as an input. For example, at unusually high ambient temperatures, the start up of the second compressor 70 could be intentionally delayed or the speed of the second compressor 70 upon start-up could be reduced (e.g., to about 40% rather than about 50% of full capacity). Additionally or alternatively, at block 152, the controller 130 may receive a signal from a sensor $S_3$ that is configured to sense a temperature of the interior 16c of cabinet 16 and to send a signal to the controller 130 that is indicative of the sensed temperature. At block 174, the controller 130 prevents activation of the second compressor 70 if the sensed temperature is higher than a predetermined value (block 175), such that the heat exchanger 44 is provided adequate time to cool down to a predetermined level. Effectively, this delay (block 174) in activation of the second compressor 70 prevents overwhelming of the heat exchanger 44, which may be desirable to increase the life expectancy of system 20. Alternatively or additionally, the second compressor 70 could be started-up at a lower speed (e.g., about 30%-40% of capacity rather than 50% of capacity) in response to a higher cabinet interior temperature.

Figure 4:
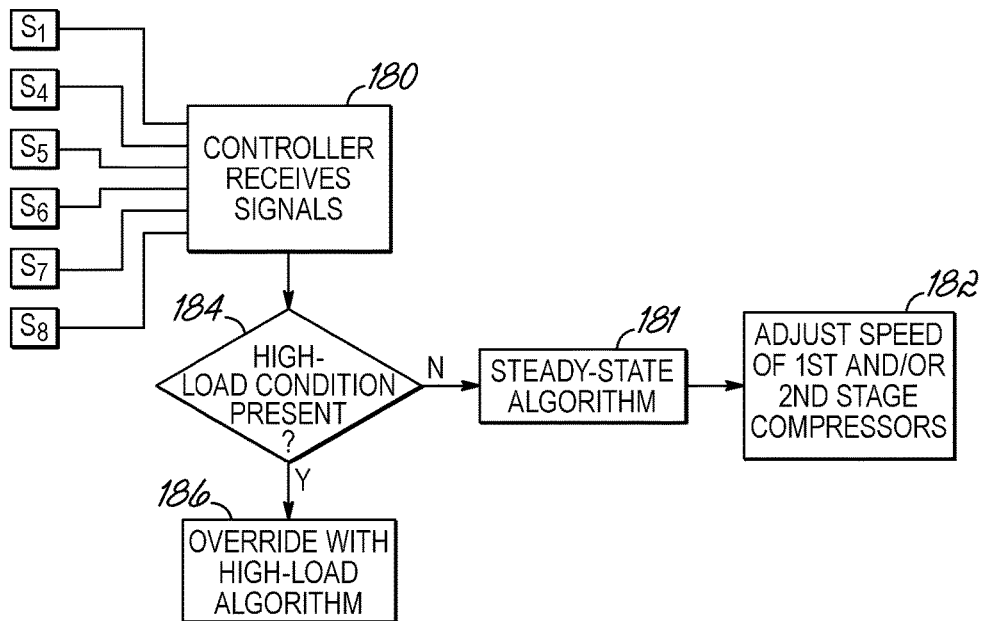
FIG. 4 is a schematic representation of steady-state protocol for operation of the system of FIG. 2.

With reference to FIG. 4, an exemplary steady-state operation of the system 20 is schematically illustrated. In the exemplary embodiment of the figure, steady-state operation mode of system 20 includes simultaneously operating both of the compressors 50, 70 most or all of the time. To this end, the system 20 operates under one or more algorithms that maintain a balance between the first and second stages 24, 26 such that, for example, the second stage load (from heat transferred from cabinet interior 16c) never exceeds the maximum capacity of the first stage 24 to remove load (i.e., heat). The following description is especially applicable when both compressors 50, 70 are of the variable speed type, but can be adapted to embodiments in which only one compressor (e.g., the second compressor 70) is of variable speed and having the other compressor (e.g., the first compressor 50) turned on and off as required. In the event both of the compressors 50, 70 are variable speed compressors, it is likely that both compressors 50, 70 will be on, with operation of one or both compressors being controlled to obtain a desired operating characteristic.

At block 180, the controller 130 receives a signal from sensor $S_1$ sensing the temperature of first refrigerant 34 at outlet 44b of the heat exchanger 44. At block 182, the controller 130 varies, in response to the signal from sensor $S_1$ and in accordance with a predetermined steady-state algorithm (block 181), the speed (e.g., the rotational speed in RPM) of one or both of the first or second compressors 50, 70, to thereby control, for example, the load that is transferred to the second stage 26. In this regard, a sensor $S_4$ may be configured to monitor the speed of the second compressor 70 and to generate a corresponding signal to the controller 130 to enable controlling of the speed of the second compressor 70.

At block 184, controller 130 determines whether a high-load condition is present in the system 20, for example, if the temperature of the interior 16c of cabinet 16 has had a step change (e.g., a sudden, relatively large increase). If such condition is detected, at block 186, the controller 130 may override the algorithm illustrated by blocks 181 and 182, and replace operation of system 20 with a high-load algorithm, described in further detail below.

With continued reference to FIG. 4, the controller 130 may, in addition or as an alternative to receiving signals from sensor $S_1$, receive a signal (block 180) from a sensor $S_5$ configured to sense the discharge pressure of the second refrigerant 36 and to send a signal indicative of the sensed pressure to the controller 130. The sensed discharge pressure of the second refrigerant 36 may be indicative of an imbalance condition in the system 20 caused, for example, by a high-load condition. If a predetermined pressure is sensed by sensor $S_5$, the controller 130 may, as explained above, (block 186), override the algorithm illustrated by blocks 181 and 182 and replace operation of system 20 with the high-load algorithm (block 186).

In addition, or as an alternative to the sensing provided by sensors $S_1$ and/or $S_5$, one or more sensors $S_6$, $S_7$, $S_8$ are operatively coupled to the controller 130 and are respectively configured to sense a discharge pressure, discharge temperature, and/or suction temperature of the first refrigerant 34. Each of these sensors $S_6$, $S_7$, $S_8$ is configured to generate a signal indicative of the sensed property or condition of the first refrigerant 34 to the controller 130 (block 180). The sensed property or condition of the first refrigerant 34 may be indicative of an imbalance condition in the system caused, for example, by a high-load condition. If a predetermined property or characteristic is sensed by one or more of the sensors $S_6$, $S_7$, $S_8$, the controller 130 may, as explained above, override the algorithm illustrated by blocks 181 and 182 and replace operation of system 20 with the high-load algorithm (block 186).

As explained above, under certain conditions, the controller 130 may override the algorithm (block 181) used during steady-state operation of system 20 and substitute for it a high-load algorithm. In this regard, and with reference to FIGS. 4 and 5, the controller 130 may receive, at block 180, one or more signals from various sensors of system 20, with these signals being indicative of a high-load condition. More specifically, for example, a high-load condition may be present if a relatively warm item is placed in the interior 16c of cabinet 16. To this end, the controller 130 may receive a signal from the sensor $S_3$ indicative of a rise in temperature of the interior 16c of cabinet 16. In a specific embodiment, the controller 130 may calculate a slope corresponding to the rise in temperature of the interior 16c over time, based on the signal from sensor $S_3$, and compare the same (block 194) to a predetermined threshold slope. In response to receiving this signal, and more specifically in response to the comparison, the controller may, at block 186, substitute the high-load algorithm for the steady-state algorithm controlling operation of system 20. Under the high-load algorithm, in one specific embodiment, the controller 130 may increase (block 202) the speed of one or both of the compressors 50, 70.

In another example, the controller 130 may receive (block 180) a signal from a sensor $S_9$ in the form of a switch, for example, configured to sense the condition of the door 16b of cabinet 16. In response to a signal from sensor $S_9$ indicating, for example, that the door 16b is open or closed, the controller 130 may at block 186, substitute the high-load algorithm for the steady-state algorithm (block 181) controlling operation of system 20. Under the high-load algorithm, as explained above, the controller 130 may for example increase (block 202) the speed of one or both of the compressors 50, 70.

In an exemplary, yet non-limiting variation to the above-discussed processing of the signal received by the controller 130 from sensor $S_9$, the controller 130 may calculate the time the door 16b remains in a predetermined condition (e.g., open) and compare this calculated time to a threshold value (block 194), in response to which the controller follows the protocol described above illustrated by blocks 186 and 202. It is contemplated that sensor $S_9$ may be configured instead to sense the condition of door 16*b* over a predetermined period of time, and to generate a signal to the controller 130 that is indicative of this condition over the predetermined period of time, in which case the system 20 obviates the comparison to a threshold value otherwise carried out by the controller 130 at block 194. For example, and without limitation, an exemplary sensor $S_9$ capable of sensing the condition of the door 16*b* over time may take the form of a switch and timer combination.

In yet another example, the controller 130 may receive (block 180) a signal from the sensor $S_2$ that is configured to sense the temperature of ambient air proximate the condenser 54 and to send a signal indicative of the sensed temperature to the controller 130. If the received signal is indicative of a temperature that exceeds a predetermined threshold (block 194), the controller follows the protocol described above illustrated by blocks 186 and 202.

In addition, or as an alternative to the above, the high-load algorithm may be triggered by the controller 130 receiving (block 180) a signal from the sensor $S_6$ indicative of a sensed discharge pressure of the first refrigerant 34 and/or from the sensor $S_5$ indicative of a sensed discharge pressure of the second refrigerant 36. In this regard, the sensed discharge pressure of the first or second refrigerants 34, 36 may be indicative of a high-load condition and compared by the controller 130 (block 194) to respective threshold pressures beyond which controller 130 would follow the protocol illustrated by blocks 186 and 202.

Figure 5:
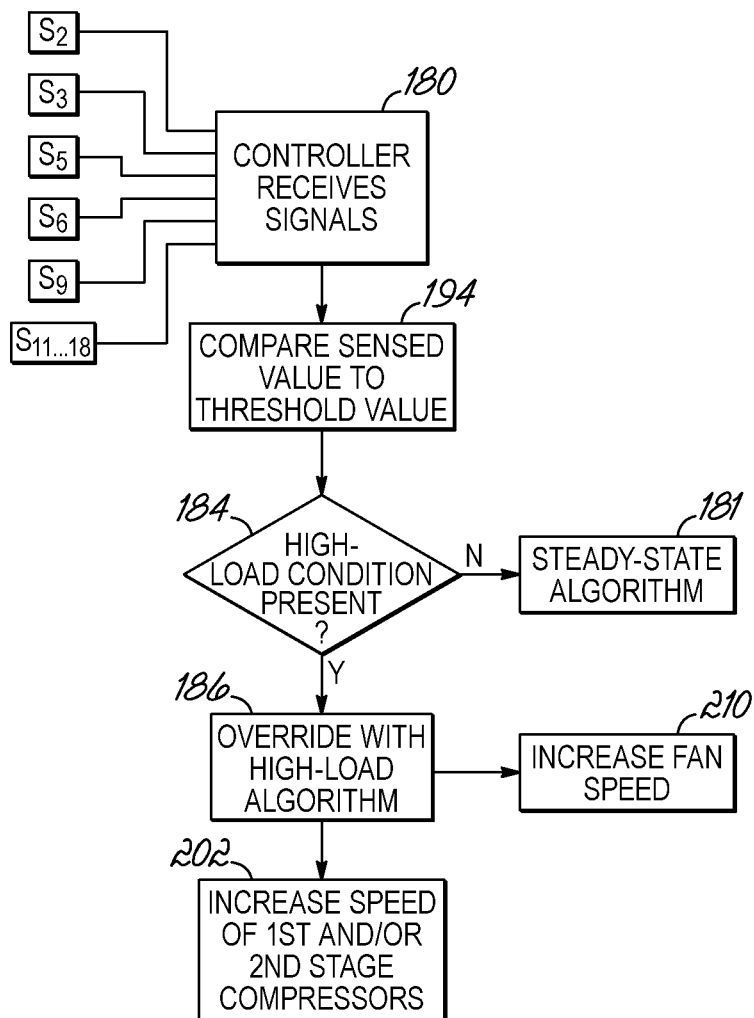
FIG. 5 is a schematic representation of another protocol for operation of the system of FIG. 2.

With particular reference to FIG. 5, the high-load algorithm may include, in specific embodiments, increasing the speed of the fan 62 directing air across the condenser 54 (block 210). This increase in speed is facilitated by the use of a variable speed fan 62. This increase in speed of fan 62 temporarily increases the rate of heat transfer from the first refrigerant 36 to the surrounding ambient 40, which results in a quicker recovery of system 20 back towards the steady-state mode of operation. Usually, but not always, an increase in the speed of fan 62 occurs concurrently with an increase in the speed of first compressor 50; however, under conditions of high ambient temperature, the speed of the fan 62 may be increased proportionally more than the speed of the first compressor 50. As indicated above, the speeds of the first compressor 50 and fan 62 may be limited based on noise control or other factors, except when extraordinary conditions are sensed.

Referring again to FIG. 2, it is contemplated that one or more other sensors $S_{10}$-$S_{18}$ may provide inputs to the controller 130 which would, in response to a signal received from one of the sensors $S_{10}$-$S_{18}$, vary the speed of the fan 62, vary the speed of one or both of the compressors 50, 70, or follow any of the other protocols described above. For example, and without limitations, a sensor $S_{10}$ and a sensor $S_{11}$ may respectively be configured to sense the sump temperature and suction temperature of the first refrigerant 34, while a sensor $S_{12}$ and a sensor $S_{13}$ may respectively be configured to sense the sump temperature and suction temperature of the second refrigerant 36. Additionally or alternatively, a sensor $S_{14}$ may be configured to sense the discharge temperature of the second refrigerant 36, a sensor $S_{15}$ may be configured to sense the temperature of the first refrigerant 34 at an inlet 44*c* to the heat exchanger 44, a pair of sensors $S_{16}$, $S_{17}$ may be configured to sense the temperature of the second refrigerant 36 respectively at an inlet 78*a* and outlet 78*b* of evaporator 78, and/or a sensor $S_{18}$ may be configured to sense the speed (e.g. rotational speed, in RPM) of the first compressor 50. Those of ordinary skill in the art will readily appreciate that the locations and configurations of these additional sensors are merely exemplary rather than limiting, and it is contemplated that other sensors may be present in system 20 in addition or as an alternative to those described above. In this regard, additional sensors may be configured to detect conditions or properties of system 20 or its surroundings that are not expressly described herein, and still fall within the scope of the present disclosure.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A two-stage cascade refrigeration system comprising:
    a first refrigeration stage defining a first fluid circuit for circulating a first refrigerant, the first refrigeration stage having a first compressor, a condenser, and a first expansion device in fluid communication with the first fluid circuit;
    a second refrigeration stage defining a second fluid circuit for circulating a second refrigerant, the second refrigeration stage having a second compressor, a second expansion device, and an evaporator in fluid communication with the second fluid circuit;
    a heat exchanger in fluid communication with the first and second fluid circuits to exchange heat between the first and second refrigerants;
    wherein at least the second compressor is a variable speed compressor;
    at least one controller operatively coupled to the first and second compressors for independently controlling operation thereof; and
    a sensor operatively coupled to the at least one controller, the sensor being configured to sense a temperature of the first refrigerant at an outlet of the heat exchanger and to generate a signal indicative of the sensed temperature to the at least one controller, the at least one controller being operable to operate the second compressor at a predetermined first speed upon activation of the second compressor in response to the signal when the sensed temperature is less than or equal to a predetermined temperature value and, thereafter, increase the speed of the second compressor to a second speed greater than the first speed.

2. A two-stage cascade refrigeration system comprising:
    a cabinet having an interior and a door providing access into the interior;
    a first refrigeration stage defining a first fluid circuit for circulating a first refrigerant, the first refrigeration stage having a first compressor, a condenser, and a first expansion device in fluid communication with the first fluid circuit;
    a second refrigeration stage defining a second fluid circuit for circulating a second refrigerant, the second refrigeration stage having a second compressor, a second expansion device, and an evaporator in fluid communication with the second fluid circuit;
a heat exchanger in fluid communication with the first and second fluid circuits to exchange heat between the first and second refrigerants;
wherein at least the second compressor is a variable speed compressor;
at least one controller operatively coupled to the first and second compressors for independently controlling operation thereof; and
a sensor operatively coupled to the at least one controller, the sensor being configured to sense a temperature of the interior of the cabinet and to generate a signal indicative of the sensed temperature to the at least one controller, the at least one controller being operable to operate the second compressor at a predetermined first speed upon activation of the second compressor in response to the signal when the sensed temperature is greater than a predetermined temperature value and, thereafter, increase the speed of the second compressor to a second speed greater than the first speed.

3. A two-stage cascade refrigeration system comprising:
a first refrigeration stage defining a first fluid circuit for circulating a first refrigerant, the first refrigeration stage having a first compressor, a condenser, and a first expansion device in fluid communication with the first fluid circuit;
a second refrigeration stage defining a second fluid circuit for circulating a second refrigerant, the second refrigeration stage having a second compressor, a second expansion device, and an evaporator in fluid communication with the second fluid circuit;
a heat exchanger in fluid communication with the first and second fluid circuits to exchange heat between the first and second refrigerants;
wherein at least the second compressor is a variable speed compressor;
at least one controller operatively coupled to the first and second compressors for independently controlling operation thereof; and
a sensor operatively coupled to the at least one controller, the sensor being configured to sense a temperature of ambient air proximate the condenser and to generate a signal indicative of the sensed temperature to the at least one controller, the at least one controller being operable to operate the second compressor at a predetermined first speed upon activation of the second compressor in response to the signal when the sensed temperature is greater than a predetermined temperature value and, thereafter, increase the speed of the second compressor to a second speed greater than the first speed.

4. A two-stage cascade refrigeration system comprising:
a first refrigeration stage defining a first fluid circuit for circulating a first refrigerant, the first refrigeration stage having a first compressor, a condenser, and a first expansion device in fluid communication with the first fluid circuit;
a second refrigeration stage defining a second fluid circuit for circulating a second refrigerant, the second refrigeration stage having a second compressor, a second expansion device, and an evaporator in fluid communication with the second fluid circuit;
a heat exchanger in fluid communication with the first and second fluid circuits to exchange heat between the first and second refrigerants;
wherein the first compressor and the second compressor are variable speed compressors;
at least one controller operatively coupled to the first and second compressors for independently controlling operation thereof, the first and second compressors being configured to operate in a steady state mode of operation and a high-load mode of operation; and
a sensor operatively coupled to the at least one controller, the sensor being configured to sense a discharge pressure of the second refrigerant and to generate a signal indicative of the sensed pressure to the at least one controller, the at least one controller being configured to switch operation of the first and second compressors from the steady state mode of operation to the high-load mode of operation in response to the signal.

5. The two-stage cascade refrigeration system of claim 4, wherein, in the steady state mode of operation, one or both of the first and second compressors operates at a maximum capacity.

6. The two-stage cascade refrigeration system of claim 4, wherein, in the steady state mode of operation, one or both of the first and second compressors operates at less than a maximum capacity.

7. The two-stage cascade refrigeration system of claim 4, wherein, in the high-load mode of operation, a speed of one or both of the first and second compressors is increased from a first speed to a second speed.

8. The two-stage cascade refrigeration system of claim 4, further comprising a variable speed fan operable to direct air across the condenser, wherein, in the high-load mode of operation, a speed of the fan is increased from a first speed to a second speed.

9. A two-stage cascade refrigeration system comprising:
a first refrigeration stage defining a first fluid circuit for circulating a first refrigerant, the first refrigeration stage having a first compressor, a condenser, and a first expansion device in fluid communication with the first fluid circuit;
a second refrigeration stage defining a second fluid circuit for circulating a second refrigerant, the second refrigeration stage having a second compressor, a second expansion device, and an evaporator in fluid communication with the second fluid circuit;
a heat exchanger in fluid communication with the first and second fluid circuits to exchange heat between the first and second refrigerants;
wherein the first compressor and the second compressor are variable speed compressors;
at least one controller operatively coupled to the first and second compressors for independently controlling operation thereof, the first and second compressor being configured to operate in a steady state mode of operation and a high-load mode of operation; and
a sensor operatively coupled to the at least one controller, the sensor being configured to sense a discharge pressure, a discharge temperature or a suction temperature of the first refrigerant and to generate a signal indicative of the sensed discharge pressure, discharge temperature or suction temperature to the at least one controller, the at least one controller being configured to switch operation of the first and second compressors from the steady state mode of operation to the high-load mode of operation in response to the signal.

10. The two-stage cascade refrigeration system of claim 9, wherein, in the steady state mode of operation, one or both of the first and second compressors operates at a maximum capacity.

11. The two-stage cascade refrigeration system of claim 9, wherein, in the steady state mode of operation, one or both of the first and second compressors operates at less than a maximum capacity.

12. The two-stage cascade refrigeration system of claim 9, wherein, in the high-load mode of operation, a speed of one or both of the first and second compressors is increased from a first speed to a second speed.

13. The two-stage cascade refrigeration system of claim 9, further comprising a variable speed fan operable to direct air across the condenser, wherein, in the high-load mode of operation, a speed of the fan is increased from a first speed to a second speed.

14. A two-stage cascade refrigeration system comprising:
a cabinet having an interior and a door providing access into the interior;
a first refrigeration stage defining a first fluid circuit for circulating a first refrigerant, the first refrigeration stage having a first compressor, a condenser, and a first expansion device in fluid communication with the first fluid circuit;
a second refrigeration stage defining a second fluid circuit for circulating a second refrigerant, the second refrigeration stage having a second compressor, a second expansion device, and an evaporator in fluid communication with the second fluid circuit;
a heat exchanger in fluid communication with the first and second fluid circuits to exchange heat between the first and second refrigerants;
wherein the first compressor and the second compressor are variable speed compressors;
at least one controller operatively coupled to the first and second compressors for independently controlling operation thereof, the first and second compressors being configured to operate in a steady state mode of operation and a high-load mode of operation; and
a sensor operatively coupled to the at least one controller, the sensor being configured to sense a temperature of the interior of the cabinet and to generate a signal indicative of the sensed temperature to the at least one controller, the at least one controller being operable to switch operation of the first and second compressors from the steady state mode of operation to the high-load mode of operation in response to a characteristic of the signal.

15. The two-stage cascade refrigeration system of claim 14, wherein the characteristic of the signal is a predetermined change of the signal.

16. The two-stage cascade refrigeration system of claim 14, wherein, in the steady state mode of operation, one or both of the first and second compressors operates at a maximum capacity.

17. The two-stage cascade refrigeration system of claim 14, wherein, in the steady state mode of operation, one or both of the first and second compressors operates at less than a maximum capacity.

18. The two-stage cascade refrigeration system of claim 14, wherein, in the high-load mode of operation, a speed of one or both of the first and second compressors is increased from a first speed to a second speed.

19. The two-stage cascade refrigeration system of claim 14, further comprising a variable speed fan operable to direct air across the condenser, wherein, in the high-load mode of operation, a speed of the fan is increased from a first speed to a second speed.

20. A two-stage cascade refrigeration system comprising:
a cabinet having an interior and a door providing access into the interior;
a first refrigeration stage defining a first fluid circuit for circulating a first refrigerant, the first refrigeration stage having a first compressor, a condenser, and a first expansion device in fluid communication with the first fluid circuit;
a second refrigeration stage defining a second fluid circuit for circulating a second refrigerant, the second refrigeration stage having a second compressor, a second expansion device, and an evaporator in fluid communication with the second fluid circuit;
a heat exchanger in fluid communication with the first and second fluid circuits to exchange heat between the first and second refrigerants;
wherein the first compressor and the second compressor are variable speed compressors;
at least one controller operatively coupled to the first and second compressors for independently controlling operation thereof, the first and second compressors being configured to operate in a steady state mode of operation and a high-load mode of operation; and
a sensor operatively coupled to the at least one controller, the sensor being configured to sense a condition of the door and to generate a signal indicative of the sensed condition to the at least one controller, the at least one controller being operable to switch operation of the first and second compressors from the steady state mode of operation to the high-load mode of operation in response to the signal.

21. The two-stage cascade refrigeration system of claim 20, wherein the sensed condition of the door is an opening of the door.

22. The two-stage cascade refrigeration system of claim 20, wherein the sensed condition of the door is a time the door remains open.

23. The two-stage cascade refrigeration system of claim 20, wherein, in the steady state mode of operation, one or both of the first and second compressors operates at a maximum capacity.

24. The two-stage cascade refrigeration system of claim 20, wherein, in the steady state mode of operation, one or both of the first and second compressors operates at less than a maximum capacity.

25. The two-stage cascade refrigeration system of claim 20, wherein, in the high-load mode of operation, a speed of one or both of the first and second compressors is increased from a first speed to a second speed.

26. The two-stage cascade refrigeration system of claim 20, further comprising a variable speed fan operable to direct air across the condenser, wherein, in the high-load mode of operation, a speed of the fan is increased from a first speed to a second speed.

27. A two-stage cascade refrigeration system comprising:
a first refrigeration stage defining a first fluid circuit for circulating a first refrigerant, the first refrigeration stage having a first compressor, a condenser, and a first expansion device in fluid communication with the first fluid circuit;
a second refrigeration stage defining a second fluid circuit for circulating a second refrigerant, the second refrigeration stage having a second compressor, a second expansion device, and an evaporator in fluid communication with the second fluid circuit;
a heat exchanger in fluid communication with the first and second fluid circuits to exchange heat between the first and second refrigerants;

wherein the first compressor and the second compressor are variable speed compressors;

at least one controller operatively coupled to the first and second compressors for independently controlling operation thereof, the first and second compressors being configured to operate in a steady state mode of operation and a high-load mode of operation; and a sensor operatively coupled to the at least one controller, the sensor being configured to sense a temperature of ambient air proximate the condenser and to generate a signal indicative of the sensed temperature to the at least one controller, the at least one controller being operable to switch operation of the first and second compressors from the steady state mode of operation to the high-load mode of operation in response to the signal.

28. The two-stage cascade refrigeration system of claim 27, wherein, in the steady state mode of operation, one or both of the first and second compressors operates at a maximum capacity.

29. The two-stage cascade refrigeration system of claim 27, wherein, in the steady state mode of operation, one or both of the first and second compressors operates at less than a maximum capacity.

30. The two-stage cascade refrigeration system of claim 27, wherein, in the high-load mode of operation, a speed of one or both of the first and second compressors is increased from a first speed to a second speed.

31. The two-stage cascade refrigeration system of claim 27, further comprising a variable speed fan operable to direct air across the condenser, wherein, in the high-load mode of operation, a speed of the fan is increased from a first speed to a second speed.

* * * * *